(12) United States Patent
Chiang

(10) Patent No.: US 11,059,274 B2
(45) Date of Patent: Jul. 13, 2021

(54) METHOD OF ENHANCED TREATMENT OF A SPILLED OIL ON AN OIL-SPILLED CONTAMINATED AREA

(71) Applicants: Fung-Ming Chiang, Taipei (TW); TAIWAN SURFACTANT CORPORATION, Taipei (TW)

(72) Inventor: Fung-Ming Chiang, Taipei (TW)

(73) Assignee: TAIWAN SURFACTANT CORPORATION, Taipei (TW)

( * ) Notice: Subject to any disclaimer, the term of this patent is extended or adjusted under 35 U.S.C. 154(b) by 0 days.

(21) Appl. No.: 15/985,824

(22) Filed: May 22, 2018

(65) Prior Publication Data
US 2018/0370206 A1     Dec. 27, 2018

(30) Foreign Application Priority Data

Jun. 23, 2017   (TW) ................................ 106121025

(51) Int. Cl.
| B32B 27/32 | (2006.01) |
| C09K 3/32 | (2006.01) |
| C02F 1/68 | (2006.01) |
| B09C 1/08 | (2006.01) |
| C02F 103/00 | (2006.01) |

(52) U.S. Cl.
CPC ............ *B32B 27/32* (2013.01); *B09C 1/08* (2013.01); *C09K 3/32* (2013.01); *B09C 2101/00* (2013.01); *C02F 1/682* (2013.01); *C02F 2103/007* (2013.01); *C02F 2305/04* (2013.01)

(58) Field of Classification Search
USPC ........................................ 210/691, 704, 705
See application file for complete search history.

(56) References Cited

U.S. PATENT DOCUMENTS

| 3,770,627 A | * | 11/1973 | Alquist | ................... | C02F 1/681 |
| | | | | | 210/693 |
| 4,332,854 A | * | 6/1982 | Parker | .................. | E02B 15/101 |
| | | | | | 428/377 |
| 2012/0074067 A1 | | 3/2012 | Podella et al. | | |
| 2014/0251919 A1 | * | 9/2014 | Man | .......................... | C02F 1/24 |
| | | | | | 210/705 |

FOREIGN PATENT DOCUMENTS

| CN | 1986584 A | 6/2007 |
| CN | 101787107 A | 7/2010 |

* cited by examiner

*Primary Examiner* — Hayden Brewster
(74) *Attorney, Agent, or Firm* — Bacon & Thomas, PLLC

(57) ABSTRACT

The present invention provides a method of enhanced treatment of spilled oil on water, land, and biological organism, which is able to clean the spilled oil efficiently, environmental-friendly and in a short time. The method comprises: contacting an oil spill area shrinking agent with spilled oil on an oil-spilled contaminated region or objects; wherein the oil spill area shrinking agent comprises a sulfosuccinate and a stabilizer without oil dissolving organic solvent, oil emulsifier, and organic fluorine or silicone surfactant. The method according to the present invention can be used to clean the land and water polluted by an oil spill and remove the oil spill from polluted biological organisms. It can also be used to recover spilled oil as resource and to reduce resulted environmental pollution.

12 Claims, 19 Drawing Sheets

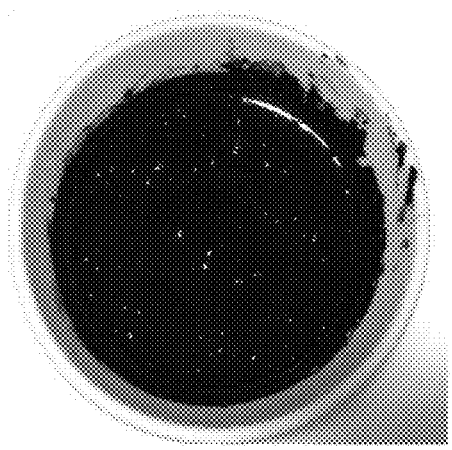
FIG. 2A
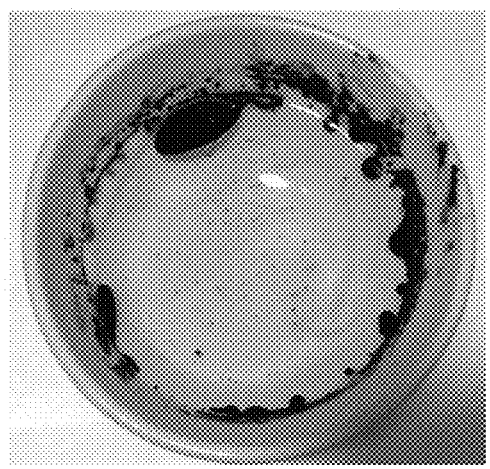 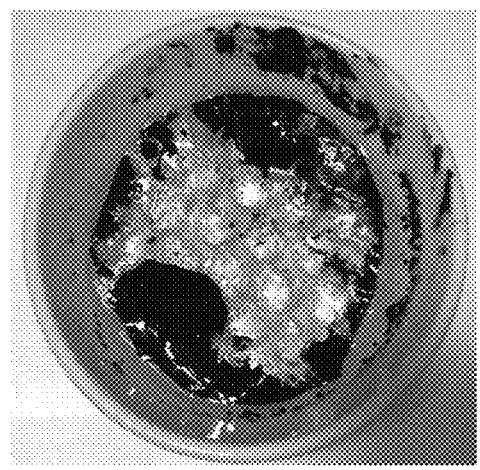
FIG. 2B         FIG. 2C
 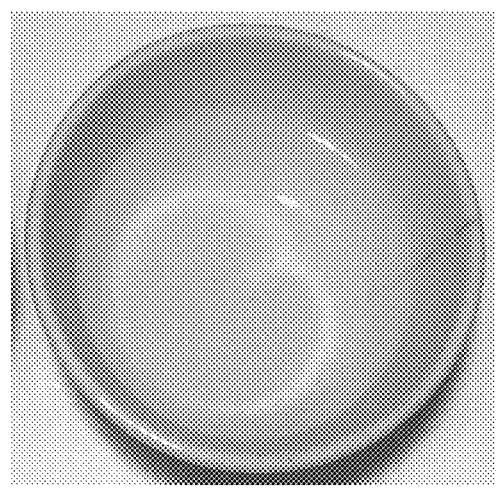
FIG. 2D         FIG. 2E

METHOD OF ENHANCED TREATMENT OF A SPILLED OIL ON AN OIL-SPILLED CONTAMINATED AREA

CROSS REFERENCE TO RELATED APPLICATION

This application claims the benefits of the Taiwan Patent Application Serial Number 106121025, filed on Jun. 23, 2017, the subject matter of which is incorporated herein by reference.

BACKGROUND OF THE INVENTION

1. Field of the Invention

The present invention relates to a method of enhanced treatment of an oil spill on water, land and biological organism, which can clean spilled oil rapidly to achieve the purpose of environmental protection.

2. Description of Related Art

Oil spills, especially crude oil spills and heavy oil spills, are common forms of environmental damage, which may cause environmental pollution on land, coastal areas, sea areas, and reefs, and endangers marine organisms. In addition, oil spills also caused explosions and fire accidents, resulting in heavy casualties, and economic damages and losses in the oil-spilled region. Oil spilled into ocean caused by humane activity exceeds ten million tons, and one fifth of the spilled oil is caused by blowout accident of offshore oil well and tanker accident. The aforesaid negative impact may be a long-term influence.

The current method for cleaning spilled oil is to restrict the spilled oil in a certain region with an oil boom, and treat the spilled oil by a mechanical recovery method, a chemical method, a biological method or a burning method.

Herein, the mechanical recovery method is performed by using a specific apparatus to recycle the spilled oil. However, this method has its external restrictions. For example, this method can only be held on unopened water areas, ports or calm sea, and can only be used to treat a thin layer of oil. The mechanical recovery method is time-consuming. Even though the mechanical recovery method is held together with high-pressure or high-temperature water, the cleaning effect on the spilled oil is still slow and incomplete. In addition, the oil-spilled damage on marine organisms (for example, fishes, turtles, shrimps, crabs, dolphins, aquatic birds, etc.) cannot be relieved by the mechanical recovery method in a short time, and massive death of the marine organisms may occur.

The chemical method is performed with a chemical oil spill dispersant (OSD) which can disperse the spilled oil into small droplets, and the spilled oil is gradually degraded by the biological organism and disappeared through the ocean current and tides. Another chemical method is performed with a solidifying agent which can convert the spilled oil on the sea into gel, and the obtained gel is recycled. Although the chemical methods are the main manner to treat the spilled oil on the sea, these methods still have their disadvantages. For example, the spilled oil cannot be recycled when treated with the chemical oil spill dispersant (OSD), large area of the spilled oil are converted into small droplets, and then the small droplets are degraded by ocean current and tides. Hence, this chemical method is a disposable and not environmental friendly. The general chemical oil spill dispersants (OSD) contain oil dissolving organic solvents, aromatic hydrocarbons and emulsifiers that may cause both the area and the depth of the water region polluted by the spilled oil; thus, extensive short-term or long-term damage on the water may occur. Chemical oil spill dispersants (OSD) are used as normal emergency manners for treating spilled oil on marine ecosystems worldwide. It is supposed that the spilled oil can be degraded by organisms, so the chemical oil spill dispersants (OSD) are used to increase the solubility of the spilled oil in water. However, in fact, due to high amount of oil dissolving organic solvent, aromatic hydrocarbon, emulsifier of all conventional oil spill dispersants (OSD), how the chemical oil spill dispersants (OSD), influence the ecosystem of the organism and the activity of biodegradation thereof is still unknown, even it might be toxic (Literature: https://www.biologicaldiversity.org/programs/public_lands/energy/dirty_energy_development/oil_and_gas/gulf_oil_spill/dispersants.html). Current reports indicate that the spilled oil still pollute the land and the water area after several years pass. On the other hand, massive wastes unable to be handled are generated when using the chemical solidifying agents. Since the chemical solidifying agents may cause secondary pollution, they can only be used as emergency manners to treat spilled oil in small area. The aforesaid chemical methods cause long-term pollutions on water areas significantly. In addition, the spilled oil cannot be recycled and reused, resulting in wasting of resources.

In addition, the biological method is performed by some specific microorganisms with strong oxidation and degradation activities in the ocean to achieve the purpose of cleaning spilled oil. In the biological method, nutrients are dispersed on the oil-spilled region to increase the growth of the microorganisms, so the oxidation or degradation of the spilled oil can be increased. However, the growth of the microorganisms is difficult to be controlled, and the risk of influencing the marine ecology is hidden.

Furthermore, the burning method is performed by a burning process to clean the spilled oil on the sea. The burning method has to be performed in time, and the thickness of the oil film has to be at least 3 mm. Otherwise, the effect of the burning method may be undesirable. In addition, the burning method is also restricted by the weather and the safety of the burning region. In fact, the burning method is completely contrary to the environmental protection policy of carbon reduction.

For marine organisms, the oil-spilled pollution is a severe and harmful environmental pollution, which cause massive death of marine organisms. In addition, the oil-spilled pollution also causes negative impact on the economic environment of the water and the land. Currently, the method for saving the marine organisms is performed by removing viscous spilled oil on the marine organisms with manual scraping or organic solvents, and then detergents are repeatedly used to remove the spilled oil to save the lives of the marine organisms. However, this method is very complicated, time-consuming and slow, and the marine organisms polluted by the spilled oil cannot be saved in time. Thus, massive death of marine organisms still occurs. Therefore, how to solve the problem of the oil-spilled pollution on the organisms is one primary issue to be figured out.

The aforesaid methods for cleaning the spilled oil have their environmental concerns, use limitations and disadvantages. Especially, the spilled oil may be expanded to cover large area of the water region due to the weather factor, which causes the cleaning difficulty and environmental pollution. Moreover, the frequency of the oil spill is increased, and the locations of the oil spill cannot be predicted. Hence, severe damages on the marine organisms and the plant and water environment are occurred, which may be harmful to human health, natural ecosystems and economic resources. Therefore, it is desirable to provide a rapid, efficient and environmental friendly method to clean spilled oil.

SUMMARY OF THE INVENTION

An object of the present invention is to provide a method of enhanced treatment of an oil spill on water, land or biological organism.

To achieve the object, the present invention provides a method of enhanced treatment of an oil spill on water, land or biological organism, which comprises: providing an oil spill area shrinking agent (i.e. spill oil collection agent), which comprises a sulfosuccinate and a stabilizer; treating spilled oil on an oil-spilled contaminated region with the oil spill area shrinking agent; and using a polyolefin material (e.g. special polyethylene (PE) or polypropylene (PP) absorbent) to remove the spilled oil treated with the oil spill area shrinking agent (Spill oil collection agent) for recycling or reusing.

In one preferred embodiment of the present invention, the sulfosuccinate is an alkyl sulfosuccinate represented by the following formula (I):

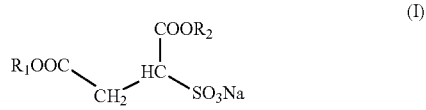

(I)

wherein $R_1$ and $R_2$ are respectively alkyl, and $R_1$ and $R_2$ are identical or different.

In one preferred embodiment of the present invention, a weight ratio (w/w %) of the sulfosuccinate to the stabilizer is in a range from 1:10 to 10:1.

In one preferred embodiment of the present invention, a weight ratio of the sulfosuccinate to the stabilizer is in a range from 3:7 to 7:3.

In one preferred embodiment of the present invention, the sulfosuccinate is selected from the group consisting of monoalkyl sulfosuccinate, dialkyl sulfosuccinate, multialkyl sulfosuccinate and a combination thereof.

In one preferred embodiment of the present invention, $R_1$ and $R_2$ in the alkyl sulfosuccinate represented by the formula (I) are respectively $C_1$-$C_{18}$ alkyl.

In one preferred embodiment of the present invention, the stabilizer is alcohol-based stabilizer.

In one preferred embodiment of the present invention, the stabilizer is selected from the group consisting of alkyl diol, alkyl polyol, polyether alkyl-diol derivatives, and a combination thereof.

In one preferred embodiment of the present invention, a weight ratio of the sulfosuccinate and the polyol in the oil spill area shrinking agent is ranged from 1:10 to 1:100,000.

In one preferred embodiment of the present invention, the polyolefin material is polyethylene, polypropylene, or a combination thereof.

In one preferred embodiment of the present invention, the polyolefin material has a granular shape, a plate shape or an irregular shape.

In one preferred embodiment of the present invention, the polyolefin material is a bubble wrap, a foam sheet, a corrugated sheet or a fabric sheet with a single layer or multilayers.

In one preferred embodiment of the present invention, the oil spill area shrinking agent is sprayed onto the oil-spilled contaminated region to reduce the oil-spilled contaminated region.

In one preferred embodiment of the present invention, the method is used to clean the spilled oil on land, coastal area, sea area, reef, stone or gravel polluted by the spilled oil.

In one preferred embodiment of the present invention, the method is used to clean the spilled oil on the body of biological organism polluted by the spilled oil.

In one preferred embodiment of the present invention, the method is applied on recycling or reuse of the spilled oil such as resource recycling of the spilled oil.

In one preferred embodiment of the present invention, the method is applied without using oil dissolving organic solvents and emulsifiers comprising aromatic hydrocarbons as well as fluorine- or silicone-containing surfactant.

In one preferred embodiment of the present invention, the method is applied without using oil dissolving organic solvents comprising aromatic hydrocarbons and surfactants comprising organic fluorine or silicone.

Other objects, advantages, and novel features of the invention will become more apparent from the following detailed description when taken in conjunction with the accompanying drawings.

BRIEF DESCRIPTION OF THE DRAWINGS

FIG. 2A to FIG. 2E are photos showing results of treating spilled oil using a method of enhanced treatment of an oil spill on water, land or biological organism of the present invention.

DETAILED DESCRIPTION OF THE PREFERRED EMBODIMENT

Novel features including specific features are encompassed by the appended claims. The technical features of the present invention can be understood according to the present specification, the embodiments based on the spirit of the present invention and the accompanying drawings. The following embodiments when read with the accompanying drawings are made to clearly exhibit the above-mentioned and other technical contents, features and/or effects of the present invention.

Figure 1A:
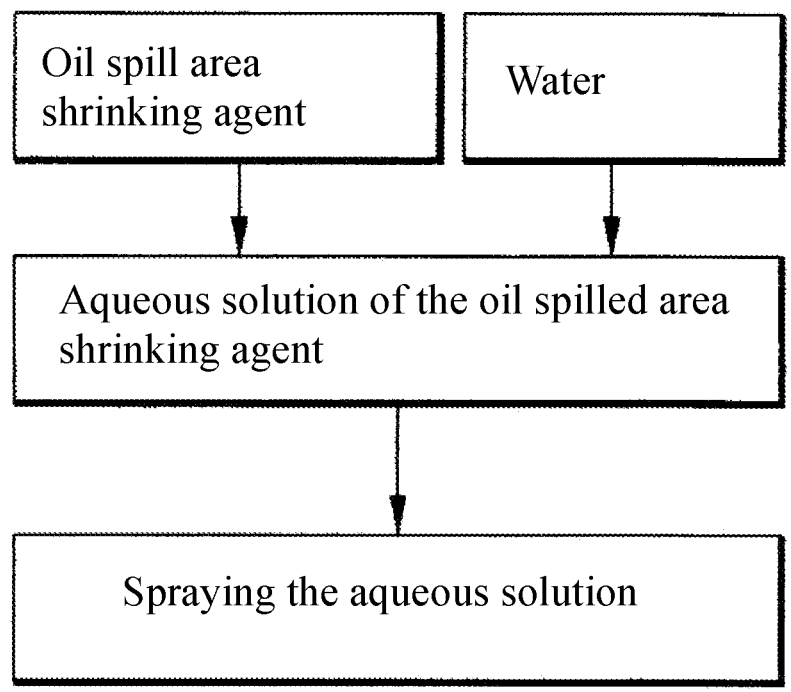
FIG. 1A is a flow chart showing a method of enhanced treatment of an oil spill on water, land or biological organism according to the present invention.

FIG. 1A is a flow chart showing a method of enhanced treatment of an oil spill according to the present invention. In the present embodiment, the method for treating spilled oil comprises: diluting an oil spilled area shrinking agent (abbreviation, OSASA, i.e. spill oil collection agent) of the present invention with water to form an aqueous solution of the oil spilled area shrinking agent; and spraying or atomizing the aqueous solution of the oil spilled area shrinking agent onto water covered by spilled oil or discharging the aqueous solution of the oil spilled area shrinking agent into water with spread spilled oil. Thus, the oil-spilled contaminated region can be rapidly reduced. The oil spilled area shrinking agent can prevent the emulsion of the spilled oil. Furthermore, the oil spilled area shrinking agent can also prevent the spread of the spilled oil as well as the expansion of the oil-spilled contaminated region.

Figure 1B:
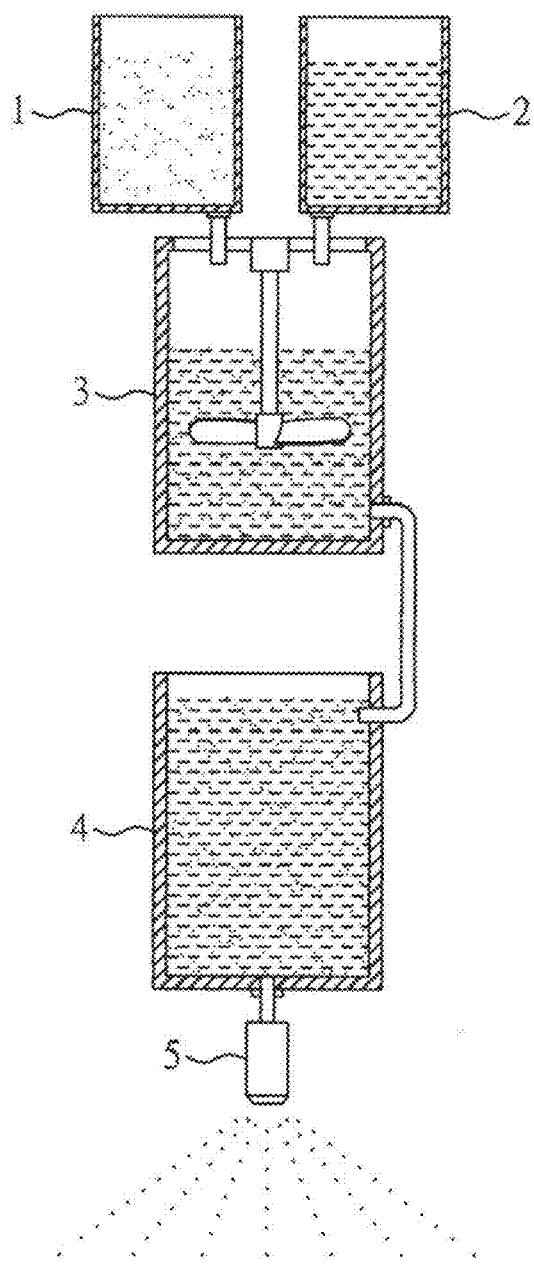
FIG. 1B schematically shows an apparatus for mixing and spraying an aqueous solution of an oil spill area shrinking agent.

FIG. 1B is a schematic diagram showing an apparatus for mixing and spraying an aqueous solution of an oil spill area shrinking agent. The apparatus comprise: a tank 1 for storing an oil spilled area shrinking agent; a water tank 2; a mixing tank 3 for mixing the oil spilled area shrinking agent and water to form an aqueous solution of the oil spilled area shrinking agent; and a storage tank 4 for storing the obtained aqueous solution of the oil spilled area shrinking agent; and a spray unit 5 for releasing, spraying or atomizing the aqueous solution of the oil spilled area shrinking agent onto a surface covered by the spilled oil. However, the structure of the apparatus is merely schematically shown and is not limited herein.

When the aqueous solution of the oil spilled area shrinking agent contacts the spilled oil, the oil-spilled contaminated region can be rapidly reduced. Furthermore, a polyolefin material is used subsequently to absorb the spilled oil in the present invention, thus the spilled oil can be easily separated from the water. After removing the spilled oil with the polyolefin material, any physical method (such as pressing, centrifugation or pouring) or chemical method (such as demulsification) can be used to separate the spilled oil from the polyolefin material. Thus, the spilled oil can be used as a recycling resource and the long-term pollution on water can be prevented.

FIG. 2A to FIG. 2E are photos showing results of treating spilled oil using a method of enhanced treatment of an oil spill on water, land or biological organism of the present invention. FIG. 2A is a photo showing that the spilled oil covered water before treating the spilled oil. FIG. 2B is a photo showing that the oil-spilled contaminated region was reduced after spraying the oil spilled area shrinking agent and the spilled oil on the water gathered in a region with small area. FIG. 2C is a photo showing that a polyolefin material was used to absorb the spilled oil and the spilled oil was adhered onto the polyolefin material. After absorption, the polyolefin material was removed from the water, wherein the polyolefin material can significantly absorb spilled oil as shown in FIG. 2D, and no significant spilled oil remained on the water as shown in FIG. 2E. The spilled oil removed by the polyolefin material can be separated from the polyolefin material with any method for resource recycling and reuse.

The method for treating spilled oil of the present invention is illustrated by the following embodiments.

Embodiment 1

Summary of the Present Embodiment

| Formulation of the oil spilled area shrinking agent | Dioctyl sulfosuccinate:propylene glycol = 1:1 |
|---|---|
| Concentration | 1.3 w/w % |
| Spraying amount | 0.3 ml |
| Spilled oil | Venezuela Merey-16 high-viscous crude oil |
| | Density (20° C.): 0.956 kg/m$^3$ |
| | Kinematic viscosity (50° C.): 191 cst |
| Material polluted by the spilled oil | Tap water (50 ml) |
| Amount of the spilled oil | 2 ml |
| Oil-spilled coverage area before treatment | 100% |
| Oil-spilled coverage area after treatment | Reduced to about 20% within 1 sec |

In the present embodiment, 1.3 w/w % of the aqueous solution of the oil spilled area shrinking agent was used, in which a weight ratio of dioctyl sulfosuccinate to propylene glycol was 1:1. In addition, the spraying amount of the aqueous solution of the oil spilled area shrinking agent was 0.3 ml.

The spilled oil used in the present embodiment was Venezuela Merey-16 high-viscous crude oil with density (20° C.) of 0.956 kg/m$^3$ and kinematic viscosity (50° C.) of 191 cst. In addition, 50 ml of tap water was used as a water sample polluted by spilled oil, and the amount of the spilled oil was 2 ml. After the spilled oil was mixed with the tap water, the coverage area of the spilled oil was 100% based on the total area of the water surface.

In the present embodiment, the method for treating the spilled oil comprises: spreading the aqueous solution of the oil spilled area shrinking agent on the water sample covered by the spilled oil via a spraying or atomizing manner; and observing the reduce of the area of the spilled oil on the water surface when the oil spilled area shrinking agent completely contacted the spilled oil. When the area of the spilled oil on the water surface was reduced, 5 circular polyethylene bubble wraps with a diameter of 7 cm and a weight of 0.25 g was used subsequently to remove the spilled oil on the water surface for 5 times. Then, the clear condition of the water was observed.

Figure 3A:
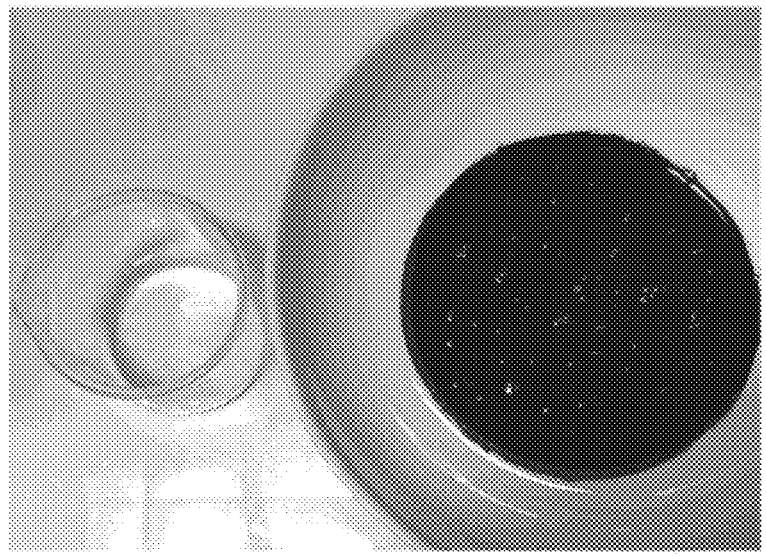
FIG. 3A is a photo showing an oil-spilled contaminated region before treatment of spilled oil according to Embodiment 1 of the present invention.
Figure 3B:
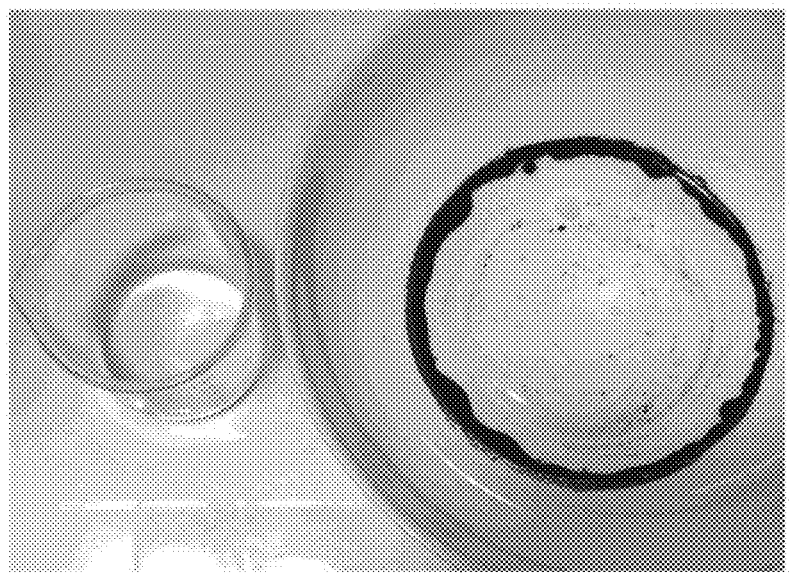
FIG. 3B is a photo showing an oil-spilled contaminated region reduced after treatment of spilled oil according to Embodiment 1 of the present invention.
Figure 4:
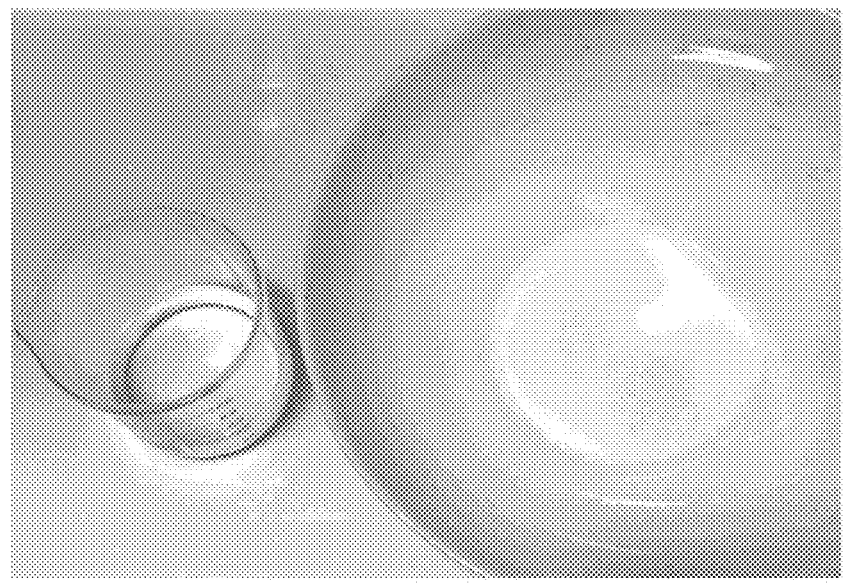
FIG. 4 is a photo showing clear water after the treatment of spilled oil according to Embodiment 1 of the present invention.

The area of the water surface covered by the spilled oil was 100%, as shown in FIG. 3A. After spraying the aqueous solution of the oil spilled area shrinking agent on the water surface, the area of the water surface covered by the spilled oil was immediately reduced to 20% when the oil spilled area shrinking agent contacted the spilled oil, as shown in FIG. 3B. In addition, the clear condition of the water sample was significantly improved after cleaning the water sample with the oil spilled area shrinking agent, as shown in FIG. 4.

Embodiment 2

Summary of the Present Embodiment

| Formulation of the oil spilled area shrinking agent | Dioctyl sulfosuccinate:propylene glycol = 1:1 |
|---|---|
| Concentration | 1.3 w/w % |
| Spraying amount | 0.3 ml |
| Spilled oil | Venezuela Boscan high-viscous crude oil |
| | Density (20° C.): 0.99 kg/m$^3$ |
| | Kinematic viscosity (50° C.): 3116 cst |
| Material polluted by the spilled oil | Tap water (50 ml) |
| Amount of the spilled oil | 2 ml |
| Oil-spilled coverage area before treatment | 100% |
| Oil-spilled coverage area after treatment | Reduced to about 15% within 1 sec |

In the present embodiment, 1.3 w/w % of the aqueous solution of the oil spilled area shrinking agent was used, in which a weight ratio of dioctyl sulfosuccinate to propylene glycol was 1:1. In addition, the spraying amount of the aqueous solution of the oil spilled area shrinking agent was 0.3 ml.

The spilled oil used in the present embodiment was Venezuela Boscan high-viscous crude oil with density (20° C.) of 0.99 kg/m$^3$ and kinematic viscosity (50° C.) of 3116 cst. In addition, 50 ml of tap water was used as a water sample polluted by spilled oil, and the amount of the spilled oil was 2 ml. After the spilled oil was mixed with the tap water, the coverage area of the spilled oil was 100% based on the total area of the water surface.

In the present embodiment, the method for treating the spilled oil comprises: spreading the aqueous solution of the oil spilled area shrinking agent on the water sample covered by the spilled oil via a spraying or atomizing manner; and observing the reduce of the area of the spilled oil on the water surface when the oil spilled area shrinking agent completely contacted the spilled oil. When the area of the spilled oil on the water surface was reduced, 5 circular polyethylene bubble wraps with a diameter of 7 cm and a weight of 0.25 g was used to remove the spilled oil on the water surface for 5 times. Then, the clear condition of the water was observed.

Figure 5A:
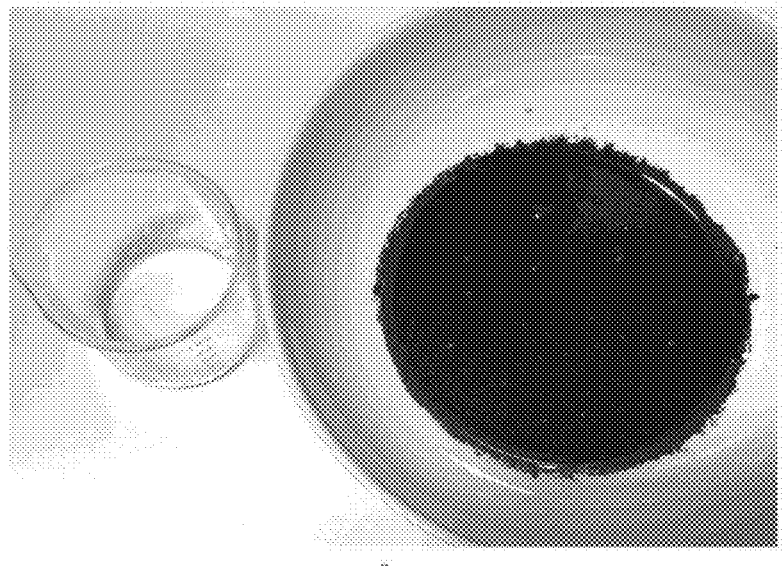
FIG. 5A is a photo showing an oil-spilled contaminated region before the treatment of spilled oil according to Embodiment 2 of the present invention.
Figure 5B:
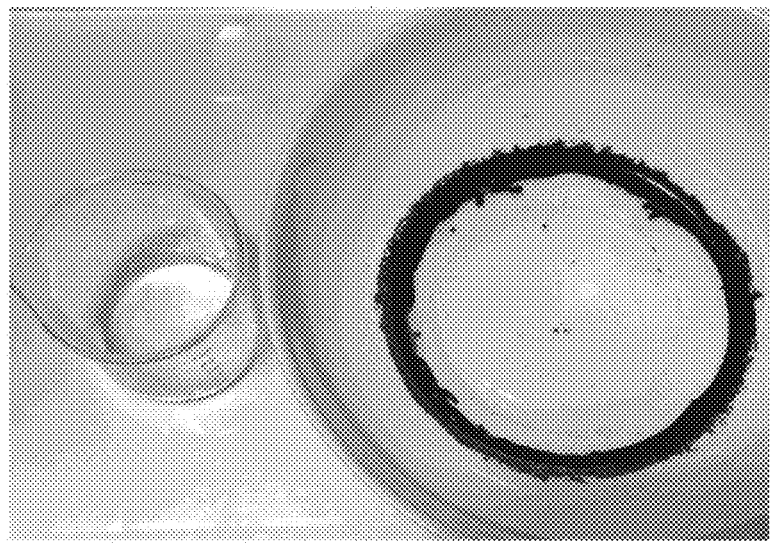
FIG. 5B is a photo showing an oil-spilled contaminated region reduced after the treatment of spilled oil according to Embodiment 2 of the present invention.
Figure 6:
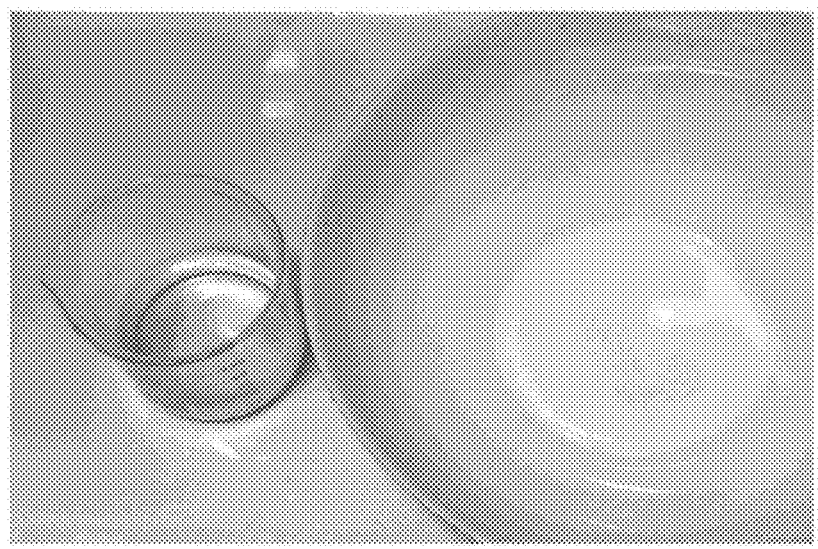
FIG. 6 is a photo showing clear water after the treatment of spilled oil according to Embodiment 2 of the present invention.

The area of the water surface covered by the spilled oil was 100%, as shown in FIG. 5A. After spraying the aqueous solution of the oil spilled area shrinking agent on the water surface, the area of the water surface covered by the spilled oil was immediately reduced to 15% when the oil spilled area shrinking agent contacted the spilled oil, as shown in FIG. 5B. In addition, the clear condition of the water sample was significantly improved after cleaning the water sample with the oil spilled area shrinking agent, as shown in FIG. 6.

Embodiment 3

Summary of the Present Embodiment

| Formulation of the oil spilled area shrinking agent | Dioctyl sulfosuccinate:propylene glycol = 1:1 |
|---|---|
| Concentration | 3 w/w % |
| Spraying amount | 0.3 ml |

-continued

| Spilled oil | Venezuela Boscan high-viscous crude oil |
| --- | --- |
| | Density (20° C.): 0.99 kg/m³ |
| | Kinematic viscosity (50° C.): 3116 cst |
| Material polluted by the spilled oil | Saline water containing 3.5 w/w % of salt (50 ml) |
| Amount of the spilled oil | 2 ml |
| Oil-spilled coverage area before treatment | 100% |
| Oil-spilled coverage area after treatment | Reduced to about 15% within 1 sec |

In the present embodiment, 3 w/w % of the aqueous solution of the oil spilled area shrinking agent was used, in which a weight ratio of dioctyl sulfosuccinate to propylene glycol was 1:1. In addition, the spraying amount of the aqueous solution of the oil spilled area shrinking agent was 0.3 ml.

The spilled oil used in the present embodiment was Venezuela Boscan high-viscous crude oil with density (20° C.) of 0.99 kg/m³ and kinematic viscosity (50° C.) of 3116 cst. In addition, 50 ml of saline water (3.5 w/w %) was used as a water sample polluted by spilled oil, and the amount of the spilled oil was 2 ml. After the spilled oil was mixed with the saline water, the coverage area of the spilled oil was 100% based on the total area of the water surface.

In the present embodiment, the method for treating the spilled oil comprises: spreading the aqueous solution of the oil spilled area shrinking agent on the water sample covered by the spilled oil via a spraying or atomizing manner; and observing the reduce of the area of the spilled oil on the water surface when the oil spilled area shrinking agent completely contacted the spilled oil. When the area of the spilled oil on the water surface was reduced, 5 circular polyethylene bubble wraps with a diameter of 7 cm and a weight of 0.25 g was used to remove the spilled oil on the water surface for 5 times. Then, the clear condition of the water was observed.

Figure 7A:
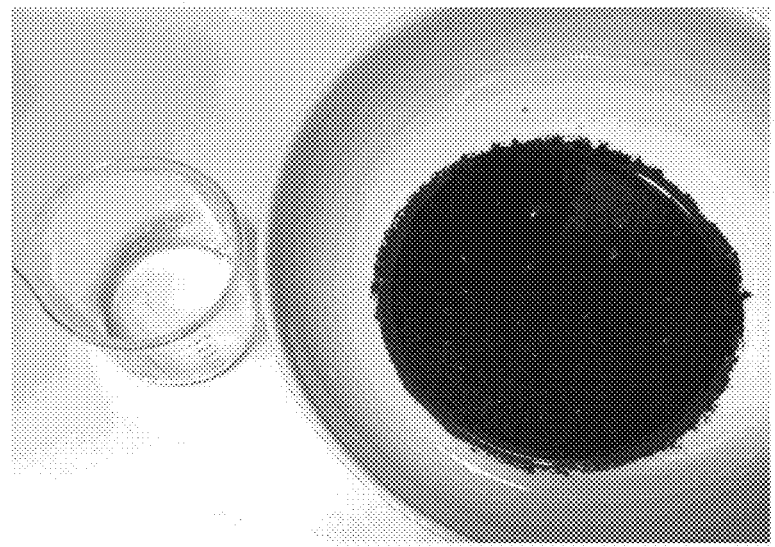
FIG. 7A is a photo showing an oil-spilled contaminated region before the treatment of spilled oil according to Embodiment 3 of the present invention.
Figure 7B:
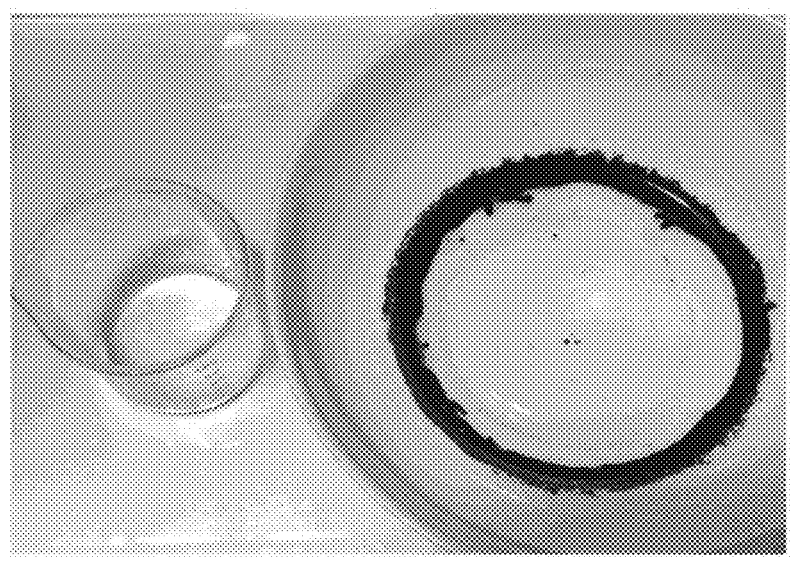
FIG. 7B is a photo showing an oil-spilled contaminated region reduced after the treatment of spilled oil according to Embodiment 3 of the present invention.
Figure 8:
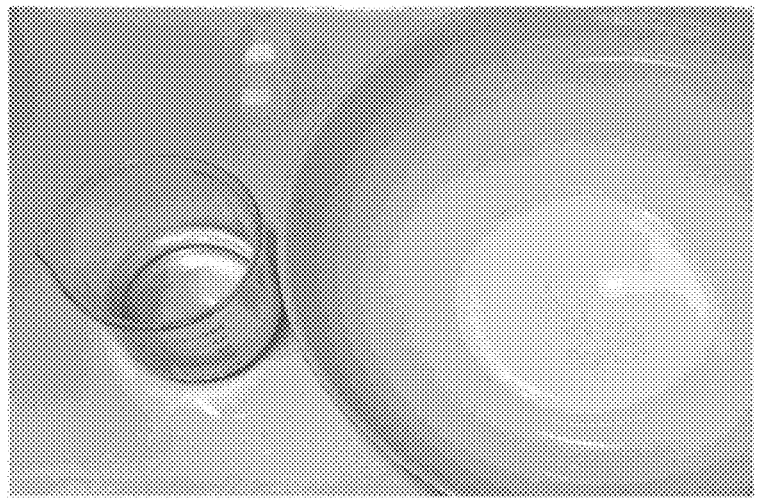
FIG. 8 is a photo showing clear water after the treatment of spilled oil according to Embodiment 3 of the present invention.

The area of the water surface covered by the spilled oil was 100%, as shown in FIG. 7A. After spraying the aqueous solution of the oil spilled area shrinking agent on the water surface, the area of the water surface covered by the spilled oil was immediately reduced to 15% when the oil spilled area shrinking agent contacted the spilled oil, as shown in FIG. 7B. In addition, the clear condition of the water sample was significantly improved after cleaning the water sample with the oil spilled area shrinking agent, as shown in FIG. 8.

Embodiment 4

Summary of the Present Embodiment

| Formulation of the oil spilled area shrinking agent | Dioctyl sulfosuccinate:propylene glycol = 2:1 |
| --- | --- |
| Concentration | 1.3 w/w % |
| Spraying amount | 0.3 ml |
| Spilled oil | Heavy oil |
| Material polluted by the spilled oil | Tap water (50 ml) |
| Amount of the spilled oil | 2 ml |
| Oil-spilled coverage area before treatment | 100% |
| Oil-spilled coverage area after treatment | Reduced to about 15% within 1 sec |

In the present embodiment, 1.3 w/w % of the aqueous solution of the oil spilled area shrinking agent was used, in which a weight ratio of dioctyl sulfosuccinate to propylene glycol was 2:1. In addition, the spraying amount of the aqueous solution of the oil spilled area shrinking agent was 0.3 ml.

The spilled oil used in the present embodiment was heavy oil. In addition, 50 ml of tap water was used as a water sample polluted by spilled oil, and the amount of the spilled oil was 2 ml. After the spilled oil was mixed with the tap water, the coverage area of the spilled oil was 100% based on the total area of the water surface.

In the present embodiment, the method for treating the spilled oil comprises: spreading the aqueous solution of the oil spilled area shrinking agent on the water sample covered by the spilled oil via a spraying or atomizing manner; and observing the reduce of the area of the spilled oil on the water surface when the oil spilled area shrinking agent completely contacted the spilled oil. When the area of the spilled oil on the water surface was reduced, 5 circular polyethylene bubble wraps with a diameter of 7 cm and a weight of 0.25 g was used to remove the spilled oil on the water surface for 5 times. Then, the clear condition of the water was observed.

Figure 9A:
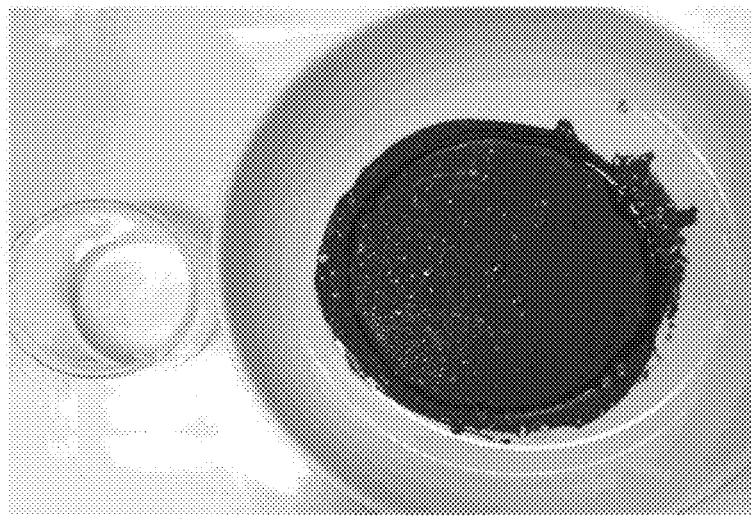
FIG. 9A is a photo showing an oil-spilled contaminated region before the treatment of spilled oil according to Embodiment 4 of the present invention.
Figure 9B:
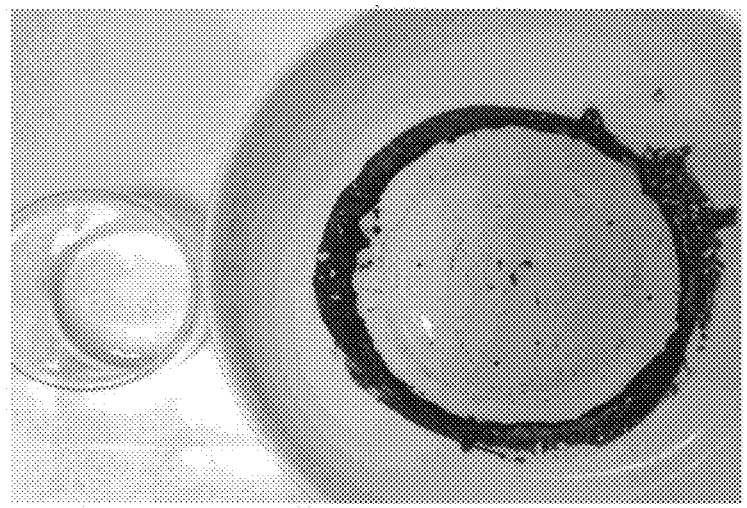
FIG. 9B is a photo showing an oil-spilled contaminated region reduced after the treatment of spilled oil according to Embodiment 4 of the present invention.

The area of the water surface covered by the spilled oil was 100%, as shown in FIG. 9A. After spraying the aqueous solution of the oil spilled area shrinking agent on the water surface, the area of the water surface covered by the spilled oil was immediately reduced to 15% when the oil spilled area shrinking agent contacted the spilled oil, as shown in FIG. 9B.

Figure 10:
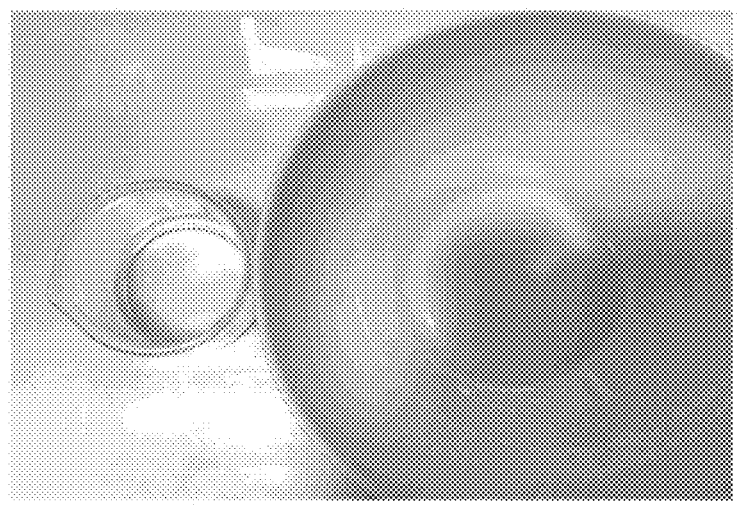
FIG. 10 is a photo showing clear water after the treatment of spilled oil according to Embodiment 4 of the present invention.

In addition, the clear condition of the water sample was significantly improved after cleaning the water sample with the oil spilled area shrinking agent, as shown in FIG. 10.

Embodiment 5

Summary of the Present Embodiment

| Formulation of the oil spilled area shrinking agent | Dioctyl sulfosuccinate:propylene glycol = 7:3 |
| --- | --- |
| Concentration | 3 w/w % |
| Spraying amount | 0.5 ml |
| Spilled oil | Heavy oil |
| Material polluted by the spilled oil | Stone |
| Oil-spilled coverage area before treatment | 100% |
| Oil-spilled coverage area after treatment | Reduced to about 15% within 5 sec |

In the present embodiment, 3 w/w % of the aqueous solution of the oil spilled area shrinking agent was used, in which a weight ratio of dioctyl sulfosuccinate to propylene glycol was 7:3. In addition, the spraying amount of the aqueous solution of the oil spilled area shrinking agent was 0.5 ml.

The spilled oil used in the present embodiment was heavy oil. In addition, a stone was used as a sample polluted by spilled oil. After the spilled oil was mixed with the stone, the coverage area of the spilled oil was 100% based on the total surface area of the stone.

In the present embodiment, the method for treating the spilled oil comprises: spreading the aqueous solution of the oil spilled area shrinking agent on the stone covered by the spilled oil via a spraying or atomizing manner; and observing the reduce of the area of the spilled oil on the stone surface when the oil spilled area shrinking agent completely contacted the spilled oil. When the area of the spilled oil on the stone surface was reduced, the stone was placed in 50 ml of water. Next, 5 circular polyethylene bubble wraps with a diameter of 7 cm and a weight of 0.25 g was used to remove the spilled oil on the water surface for 5 times. Then, the stone was removed from the water, and the clear condition of the stone was checked after the stone dried.

Figure 11A:
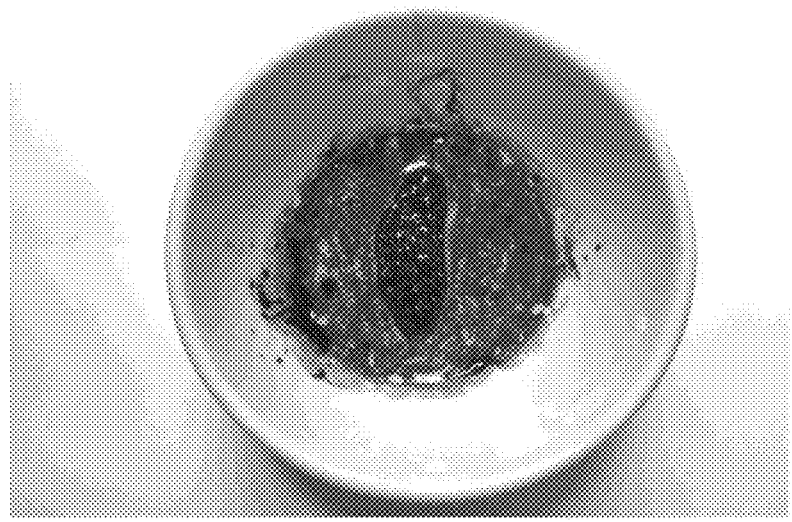
FIG. 11A is a photo showing a surface of a stone polluted by spilled oil before the treatment of spilled oil according to Embodiment 5 of the present invention.
Figure 11B:
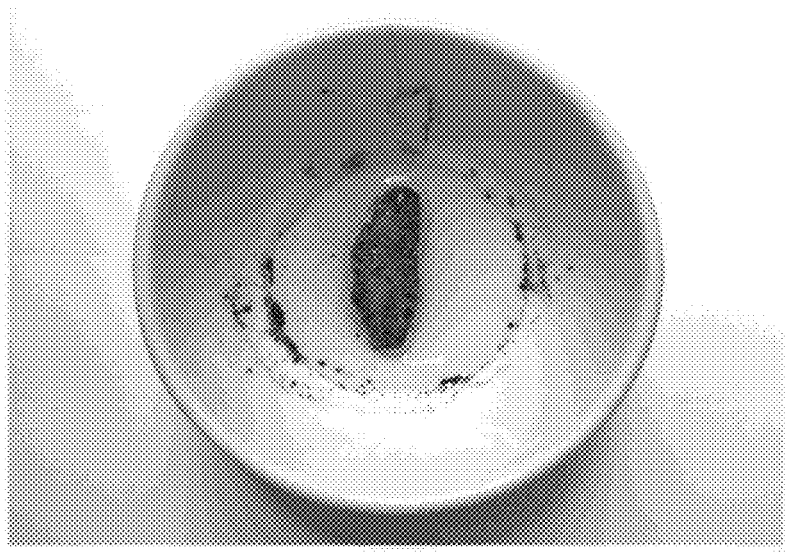
FIG. 11B is a photo showing a clean surface of the stone after spraying an oil spill area shrinking agent to clean the surface of the stone polluted by spilled oil according to Embodiment 5 of the present invention.
Figure 12A:
FIG. 12A is a photo showing a clean surface of the stone before absorbing the spilled oil with polyethylene according to Embodiment 5 of the present invention.
Figure 12B:
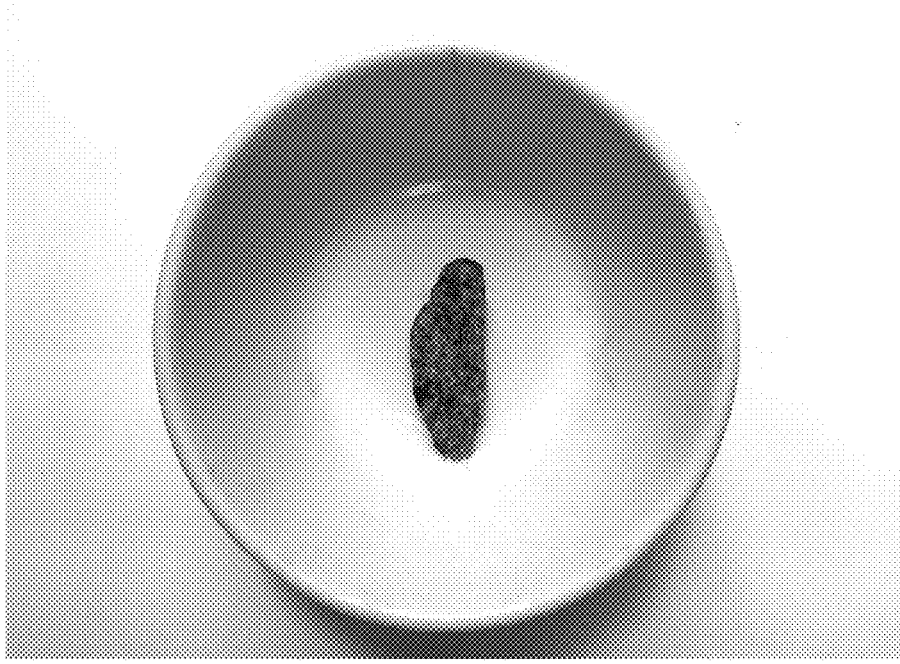
FIG. 12B is a photo showing a clean surface of the stone after absorbing the spilled oil with polyethylene according to Embodiment 5 of the present invention.

The area of the stone surface covered by the spilled oil was 100%, as shown in FIG. 11A. After spraying the aqueous solution of the oil spilled area shrinking agent on the stone surface, the area of the stone surface covered by the spilled oil was immediately reduced to 15% when the oil spilled area shrinking agent contacted the spilled oil, as shown in FIG. 11B. In addition, the clear condition of the stone was significantly improved after cleaning the stone with the aqueous solution of the oil spilled area shrinking agent, as shown in FIG. 12; and the clear condition of the water was also significantly improved.

Embodiment 6

Summary of the Present Embodiment

| | |
|---|---|
| Formulation of the oil spilled area shrinking agent | Dioctyl sulfosuccinate:propylene glycol = 1:1 |
| Concentration | 1 w/w % |
| Spraying amount | 0.3 ml |
| Spilled oil | Heavy oil |
| Material polluted by the spilled oil | Feather |
| Oil-spilled coverage area before treatment | 100% |
| Oil-spilled coverage area after treatment | Reduced to about 20% within 10 sec |

In the present embodiment, 1 w/w % of the aqueous solution of the oil spilled area shrinking agent was used, in which a weight ratio of dioctyl sulfosuccinate to propylene glycol was 1:1. In addition, the spraying amount of the aqueous solution of the oil spilled area shrinking agent was 0.3 ml.

The spilled oil used in the present embodiment was heavy oil. In addition, a feather was used as a sample polluted by spilled oil. After the spilled oil was mixed with the feather, the coverage area of the spilled oil was 100% based on the total surface area of the feather.

In the present embodiment, the method for treating the spilled oil comprises: spreading the aqueous solution of the oil spilled area shrinking agent on the feather covered by the spilled oil via a spraying or atomizing manner; and observing the reduce of the area of the spilled oil on the feather surface when the oil spilled area shrinking agent completely contacted the spilled oil. When the area of the spilled oil on the feather surface was reduced, the feather was placed in 50 ml of water. Next, 4 circular polyethylene bubble wraps with a diameter of 7 cm and a weight of 0.25 g was used to remove the spilled oil on the water surface for 4 times. Then, the feather was removed from the water, and the clear condition of the feather was checked after the feather dried.

Figure 13A:
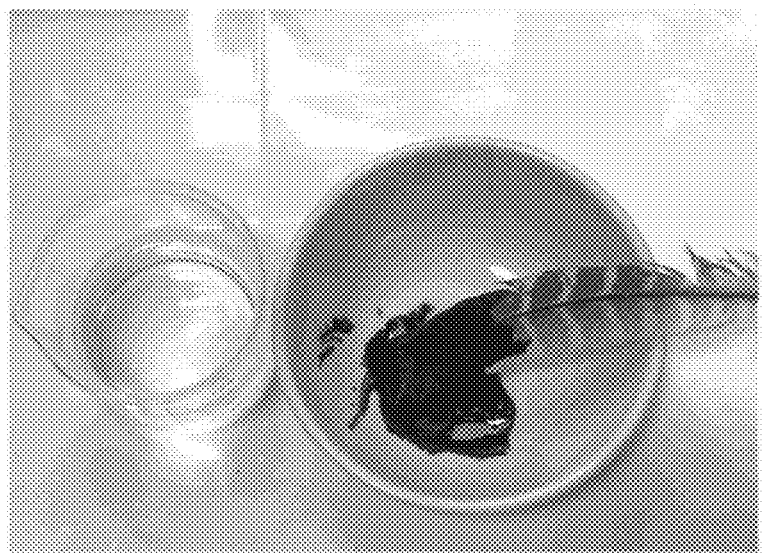
FIG. 13A is a photo showing a surface of a feather polluted by spilled oil before the treatment of spilled oil according to Embodiment 6 of the present invention.
Figure 13B:
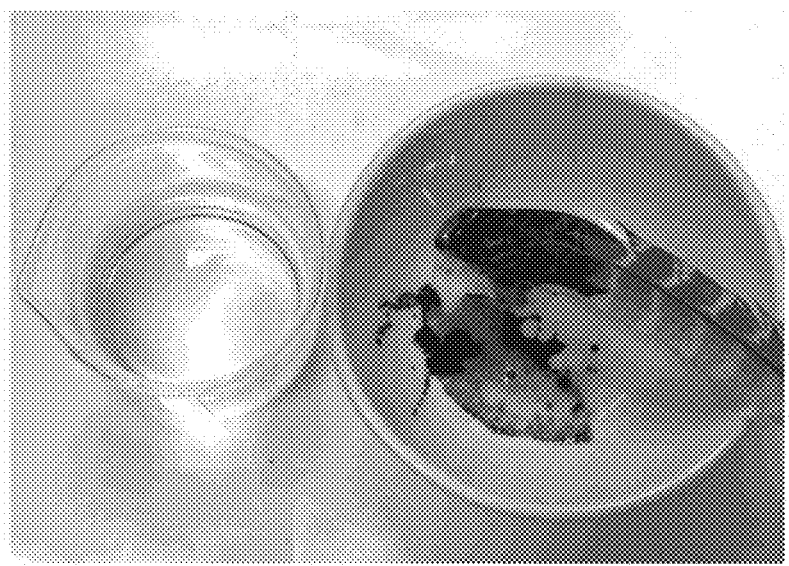
FIG. 13B is a photo showing a clean surface of the feather after spraying an oil spill area shrinking agent to clean the surface of the feather polluted by spilled oil according to Embodiment 6 of the present invention.
Figure 14A:
FIG. 14A is a photo showing the clean surface of the feather after absorbing the spilled oil with polyethylene according to Embodiment 6 of the present invention.
Figure 14B:
FIG. 14B is a photo showing the other side of the clean surface of the feather after absorbing the spilled oil with polyethylene according to Embodiment 6 of the present invention.

The area of the feather surface covered by the spilled oil was 100%, as shown in FIG. 13A. After spraying the aqueous solution of the oil spilled area shrinking agent on the feather surface, the area of the feather surface covered by the spilled oil was immediately reduced to 20% when the oil spilled area shrinking agent contacted the spilled oil, as shown in FIG. 13B. In addition, the clear condition of the feather was significantly improved after cleaning the feather with the aqueous solution of the oil spilled area shrinking agent, as shown in FIG. 14A and FIG. 14B; and the clear condition of the water was also significantly improved.

Embodiment 7

Summary of the Present Embodiment

| | |
|---|---|
| Formulation of the oil spilled area shrinking agent | Dioctyl sulfosuccinate:propylene glycol = 7:3 |
| Concentration | 3 w/w % |
| Spraying amount | 0.5 ml |
| Spilled oil | Heavy oil |
| Material polluted by the spilled oil | Gravel |
| Oil-spilled coverage area before treatment | 100% |
| Oil-spilled coverage area after treatment | Reduced to about 15% within 5 sec |

In the present embodiment, 3 w/w % of the aqueous solution of the oil spilled area shrinking agent was used, in which a weight ratio of dioctyl sulfosuccinate to propylene glycol was 7:3. In addition, the spraying amount of the aqueous solution of the oil spilled area shrinking agent was 0.5 ml.

Figure 15A:
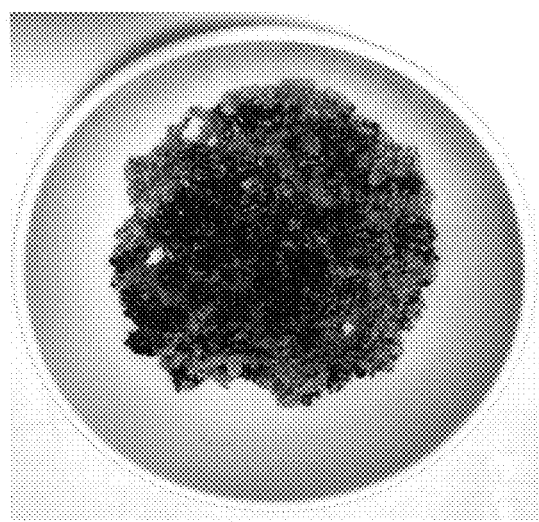
FIG. 15A is a photo showing a mixture of spilled oil and gravels before the treatment of spilled oil according to Embodiment 7 of the present invention.

The spilled oil used in the present embodiment was heavy oil. In addition, 50 g of gravel was used as a sample polluted by spilled oil. After the spilled oil was mixed with the gravel and before the gravel was cleaned, the spilled oil covered and permeated through the gravel, as shown in FIG. 15A.

Figure 15B:
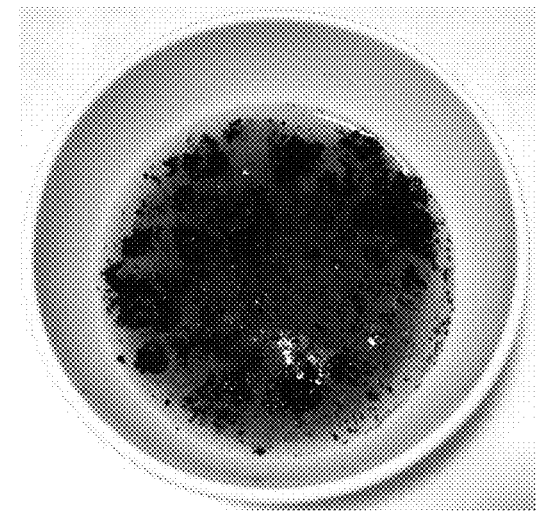
FIG. 15B is a photo showing a condition that spilled oil is formed on water after adding water into the mixture of spilled oil and gravels according to Embodiment 7 of the present invention.
Figure 15C:
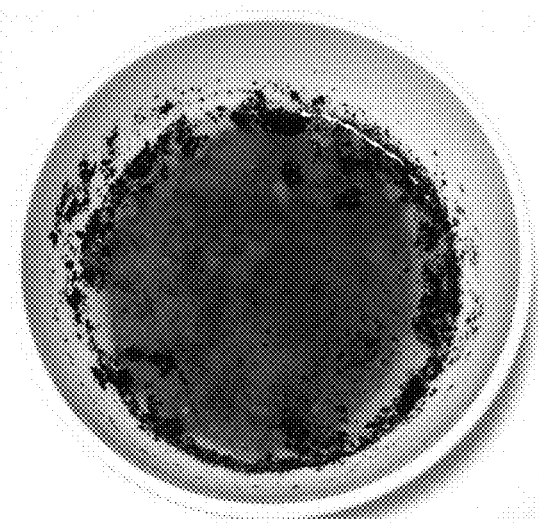
FIG. 15C is a photo showing an oil-spilled contaminated region reduced after spraying an oil spill area shrinking agent according to Embodiment 7 of the present invention.
Figure 16A:
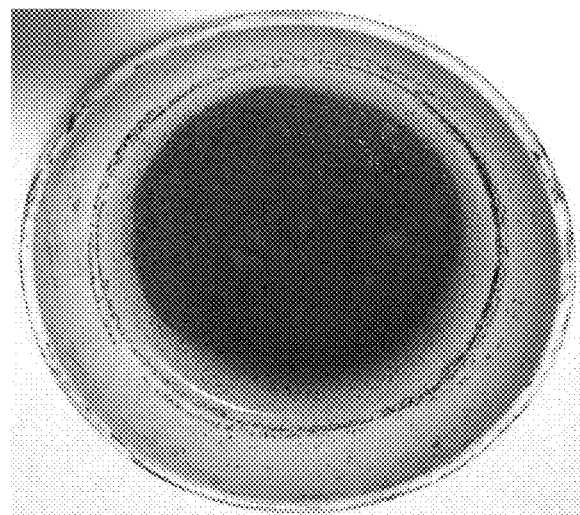
FIG. 16A is a photo showing that gravels polluted by spilled oil is cleaned by spraying an oil spill area shrinking agent before being absorbed by polyethylene according to Embodiment 7 of the present invention.
Figure 16B:
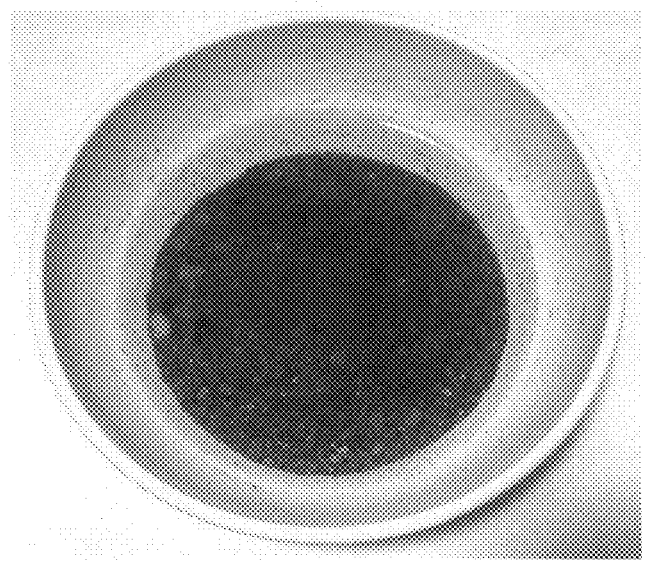
FIG. 16B is a photo showing that spilled oil treated with an oil spill area shrinking agent is absorbed by a polyethylene bubble wrap according to Embodiment 7 of the present invention.
Figure 16C:
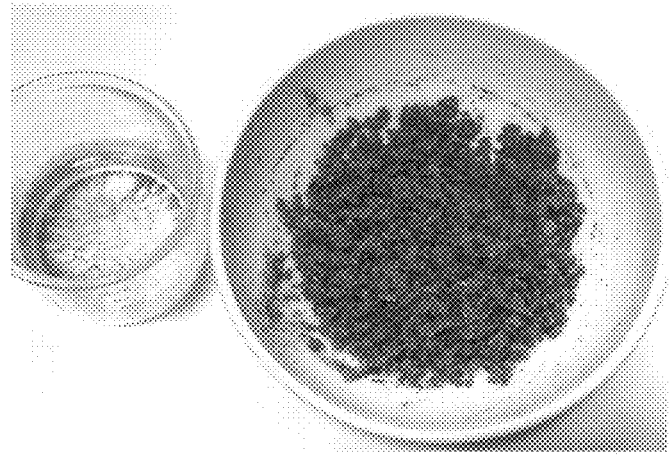
FIG. 16C is a photo showing clean water and gravels after the treatment according to Embodiment 7 of the present invention.

In the present embodiment, the method for treating the spilled oil comprises: adding 70 ml of water as shown in FIG. 15B, and spreading the aqueous solution of the oil spilled area shrinking agent on the water surface covered by the spilled oil via a spraying or atomizing manner. The area of the spilled oil on the water surface was immediately reduced when the oil spilled area shrinking agent completely contacted the spilled oil, as shown in FIG. 15C. When the area of the spilled oil on the water surface was reduced as shown in FIG. 16A, 6 circular polyethylene bubble wraps with a diameter of 7 cm and a weight of 0.25 g was used to remove the spilled oil on the water surface for 6 times under stirring as shown in FIG. 16B. Then, the gravel was removed from the water, the clear condition of the gravel was checked after the gravel dried, and the clear condition of the water was also checked, as shown in FIG. 16C.

Embodiment 8

Summary of the Present Embodiment

| | |
|---|---|
| Formulation of the oil spilled area shrinking agent | Dioctyl sulfosuccinate:propylene glycol = 2:1 |
| Concentration | 1.6 w/w % |
| Spraying amount | 0.3 ml |
| Spilled oil | Heavy oil |
| Material polluted by the spilled oil | Tap water (50 g) |
| Amount of the spilled oil | 10 g |
| Oil-spilled coverage area before treatment | 133 cm$^2$ (100%) |
| Oil-spilled coverage area after treatment | Reduced to about 20% within 1 sec |

In the present embodiment, 1.6 w/w % of the aqueous solution of the oil spilled area shrinking agent was used, in which a weight ratio of dioctyl sulfosuccinate to propylene glycol was 2:1. In addition, the spraying amount of the aqueous solution of the oil spilled area shrinking agent was 0.3 ml.

The spilled oil used in the present embodiment was heavy oil. In addition, 50 g of tap water was used as a water sample polluted by spilled oil, and the amount of the spilled oil was 10 g. After the spilled oil was mixed with the tap water, the coverage area of the spilled oil was 133 cm$^2$, and the coverage was 100% based on the total area of the water surface.

In the present embodiment, the method for treating the spilled oil comprises: spreading the aqueous solution of the oil spilled area shrinking agent on the water sample covered by the spilled oil via a spraying or atomizing manner; and observing the reduce of the area of the spilled oil on the water surface when the oil spilled area shrinking agent completely contacted the spilled oil. When the area of the spilled oil on the water surface was reduced, square polyethylene bubble wraps with a size of 11 cm×11 cm and a weight of 0.44 g was used to remove the spilled oil on the water surface for 4 times. Then, the clear condition of the water was observed. In addition, the spilled oil absorbed by the polyethylene bubble wraps was separated by a pressing manner.

Figure 17A:
FIG. 17A is a photo showing an oil-spilled contaminated region before spraying an oil spill area shrinking agent according to Embodiment 8 of the present invention.
Figure 17B:
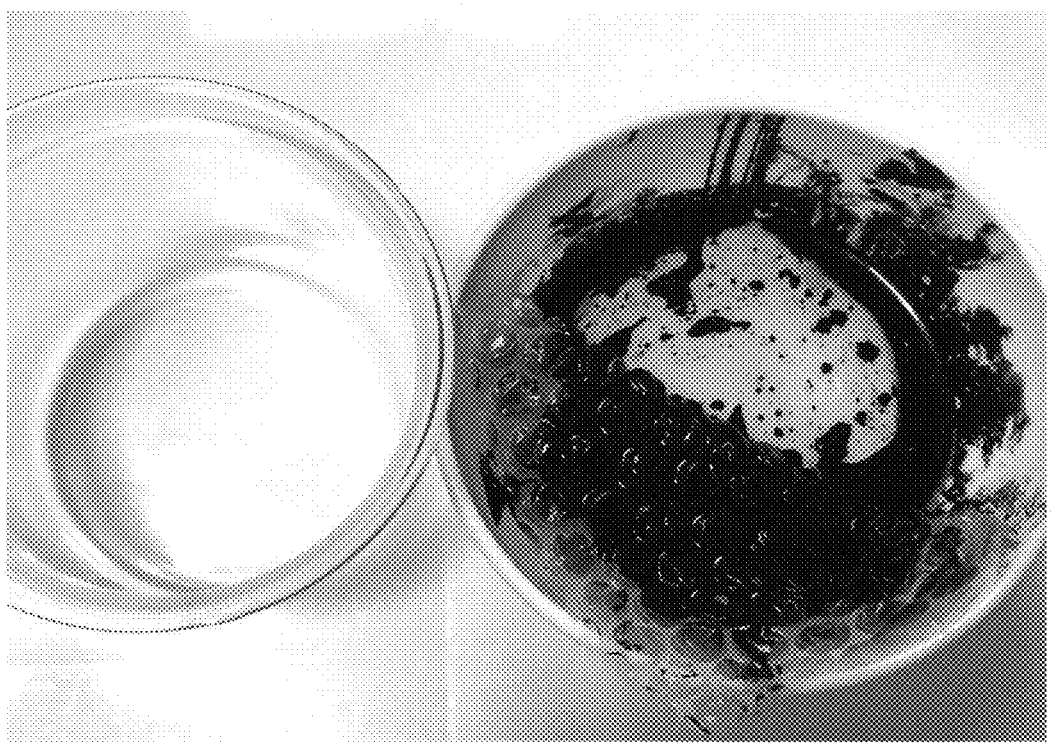
FIG. 17B is a photo showing that an oil-spilled contaminated region is reduced and a polyethylene bubble wrap is used to absorb the spilled oil according to Embodiment 8 of the present invention.
Figure 18:
FIG. 18 is a photo showing that the polyethylene bubble wrap absorbs spilled oil according to Embodiment 8 of the present invention.

The area of the water surface covered by the spilled oil was 100%, as shown in FIG. 17A. After spraying the aqueous solution of the oil spilled area shrinking agent on the water surface, the area of the water surface covered by the spilled oil was immediately reduced to 20% when the oil spilled area shrinking agent contacted the spilled oil. Then, a polyethylene bubble wrap was placed, as shown in FIG. 17B. After the polyethylene bubble wraps absorbed the spilled oil, the spilled oil absorbed by the polyethylene bubble wraps were separated from the polyethylene bubble wraps, as shown in FIG. 18. The water sample was clear. The gained weight on the bubble wraps was 9.42 g after absorbing the spilled oil. 10% of the gained weight may be the moisture contained in the bubble wraps. Hence, the recycled spilled oil has a weight of 90% of the gained weight, which is 8.48 g (9.42 g×90%=8.48 g). In other word, about 84.8% of the spilled oil can be recycled and reused by the method of the present invention.

In conclusion, the present invention provides a method of enhanced treatment of an oil spill on water, land or biological organism, which can achieve the following effects.

First, in the method of enhanced treatment of an oil spill on water, land or biological organism of the present invention, an oil spill area shrinking agent is sprayed on an oil-spilled contaminated region to rapidly reduce the area of the oil-spilled contaminated region. Thus, the region influenced by the spilled oil can be controlled in a short time, and the effect of cleaning the spilled oil can be improved.

Second, after the area of the oil-spilled contaminated region is rapidly reduced by the method of enhanced treatment of an oil spill on water, land or biological organism of the present invention, a polyethylene (PE) material or a polypropylene (PP) material with high affinity to the spilled oil is used to absorb and clean the spilled oil.

Third, in the method of enhanced treatment of an oil spill on water, land or biological organism of the present invention, the oil spill area shrinking agent does not comprise any organic solvent or aromatic hydrocarbons. Thus, the oil spill area shrinking agent is non-toxic and harmless to biological organism. In addition, the oil spill area shrinking agent is biodegradable. In detail, the method employing the oil spill area shrinking agent according to the present invention is applied without using any organic oil dissolving solvent, oil emulsifier, and organic fluorine- or silicone-containing surfactant.

Fourth, in the method of enhanced treatment of an oil spill on water, land or biological organism of the present invention, the oil spill area shrinking agent is different from the chemical oil dispersant. The chemical oil dispersant disperses the spilled oil into droplets, and the spilled oil is gradually degraded by the biological organism and disappeared through the ocean current and tides. Thus, long-term pollution on the ocean can be prevented by using the oil spill area shrinking agent of the present invention.

Fifth, in the method of enhanced treatment of an oil spill on water, land or biological organism of the present invention, a polyethylene (PE) material or a polypropylene (PP) material with high affinity to the spilled oil is used to absorb and clean the spilled oil. Thus, the environmental pollutions and financial losses caused by the spilled oil can be effectively reduced.

Sixth, the method of enhanced treatment of an oil spill on water, land or biological organism of the present invention can be applied on saline water containing salts, such as sea water.

Seventh, the method of enhanced treatment of an oil spill on water, land or biological organism of the present invention can effectively clean the spilled oil on land, coastal area, sea area, reef, stone or gravel polluted by the spilled oil.

Eighth, the method of enhanced treatment of an oil spill on water, land or biological organism of the present invention can effectively clean the spilled oil on biological organism polluted by the spilled oil. Thus, the damage caused by the oil-spilled pollution on the marine organisms can be rapidly relieved.

Ninth, in the method of enhanced treatment of an oil spill on water, land or biological organism of the present invention, after the spilled oil is absorbed by the polyolefin material, the spilled oil can be separated from the polyolefin material and recycled by any physical method (such as pressing, centrifugation or pouring) or chemical method (such as demulsification). The obtained oil after recycling can be applied on oil regeneration. In addition, the polyethylene (PE) material or the polypropylene (PP) material treated by the physical method can be used as fuel.

Tenth, the present invention provides a rapid, efficient, convenient and economic method of enhanced treatment of an oil spill on water, land or biological organism of the present invention.

A person skilled in the art can understand that the contents of the preferred embodiments disposed in the present invention are only used for explanation. A person skilled in the art can make possible changes or modifications to practice the present invention without departing from the features of the present invention. According to the embodiments disclosed herein, several possible changes can be made to practice the present invention without difficulty. The scope of the present invention is defined by the claims, and comprises the aforesaid methods, structures and equivalent inventions.

What is claimed is:

1. A method of enhanced treatment of a spilled oil on an oil-spilled contaminated area, comprising:
   providing an oil spill area shrinking agent, which consists of a sulfosuccinate and a stabilizer;
   contacting the spilled oil on the oil-spilled contaminated area with the oil spill area shrinking agent to reduce the oil-spilled contaminated area; and using a polyolefin material to remove the spilled oil treated with the oil spill area shrinking agent;

wherein the oil spill area shrinking agent does not comprise any oil dissolving organic solvent, oil emulsifier, organic fluorine- or silicone-containing surfactant, and the sulfosuccinate is an alkyl sulfosuccinate represented by the following formula (I):

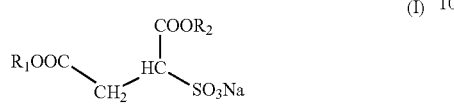

(I)

wherein R1 and R2 are respectively alkyl, and R1 and R2 are identical or different; and wherein the stabilizer is selected from the group consisting of alkyl diol, alkyl polyol, polyether alkyl-diol derivatives, and a combination thereof.

2. The method of claim 1, wherein a ratio of the sulfosuccinate to the stabilizer is in a range from 1:10 to 10:1.

3. The method of claim 2, wherein a ratio of the sulfosuccinate to the stabilizer is in a range from 3:7 to 7:3.

4. The method of claim 1, wherein the sulfosuccinate is selected from the group consisting of monoalkyl sulfosuccinate, dialkyl sulfosuccinate, multialkyl sulfosuccinate and a combination thereof.

5. The method of claim 1, wherein R1 and R2 are respectively C1-C18 alkyl.

6. The method of claim 1, wherein a weight ratio of the sulfosuccinate and the polyol in the oil spill area shrinking agent is ranged from 1:10 to 1:100,000.

7. The method of claim 1, wherein the polyolefin material is polyethylene, polypropylene, or a combination thereof.

8. The method of claim 1, wherein the polyolefin material has a granular shape, a plate shape or an irregular shape.

9. The method of claim 1, wherein the polyolefin material is a bubble wrap, a foam sheet, a corrugated sheet or a fabric sheet with a single layer or multilayers.

10. The method of claim 1, which is used to clean the spilled oil on land, coastal area, reef, stone, water, marine organisms with feather, or gravel polluted by the spilled oil.

11. The method of claim 1, which is used to clean the spilled oil on biological organisms polluted by the spilled oil.

12. The method of claim 1, wherein the stabilizer is alkyl diol.

* * * * *